United States Patent
Zhang et al.

(10) Patent No.: US 10,317,025 B2
(45) Date of Patent: Jun. 11, 2019

(54) THROUGH WALL LIGHTING

(71) Applicant: Dialight Corporation, Farmingdale, NJ (US)

(72) Inventors: Yinan Zhang, Long Branch, NJ (US); Chakrakodi Shastry, Princeton, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 15/935,613

(22) Filed: Mar. 26, 2018

(65) Prior Publication Data

US 2018/0274742 A1     Sep. 27, 2018

Related U.S. Application Data

(60) Provisional application No. 62/477,180, filed on Mar. 27, 2017.

(51) Int. Cl.

| | |
|---|---|
| *F21S 8/02* | (2006.01) |
| *F21V 5/04* | (2006.01) |
| *F21V 7/00* | (2006.01) |
| *F21V 7/24* | (2018.01) |
| *F21V 8/00* | (2006.01) |
| *F21W 111/00* | (2006.01) |
| *F21W 111/06* | (2006.01) |
| *F21Y 103/33* | (2016.01) |
| *F21Y 105/10* | (2016.01) |
| *F21Y 115/10* | (2016.01) |
| *F21W 131/107* | (2006.01) |

(52) U.S. Cl.
CPC ............ *F21S 8/024* (2013.01); *G02B 6/0008* (2013.01); *G02B 6/0096* (2013.01); *F21V 5/04* (2013.01); *F21V 7/0091* (2013.01); *F21V 7/24* (2018.02); *F21W 2111/00* (2013.01); *F21W 2111/06* (2013.01); *F21W 2131/107* (2013.01); *F21Y 2103/33* (2016.08); *F21Y 2105/10* (2016.08); *F21Y 2115/10* (2016.08)

(58) Field of Classification Search
CPC ..... F21S 8/024; G02B 6/0008; G02B 6/0096; F21Y 2103/33; F21Y 2105/10; F21Y 2115/10; F21V 7/24; F21V 7/0091; F21V 5/04; F21W 2111/00; F21W 2111/06; F21W 2131/107

See application file for complete search history.

(56) References Cited

U.S. PATENT DOCUMENTS

| | | | |
|---|---|---|---|
| 8,876,348 B2 | 11/2014 | Kelly et al. | |
| 2003/0147241 A1* | 8/2003 | Hildebrand | ........ A61H 33/6063 |
| | | | 362/231 |
| 2006/0002105 A1* | 1/2006 | Hinojosa, Jr. | ........ A61H 33/027 |
| | | | 362/101 |

(Continued)

FOREIGN PATENT DOCUMENTS

WO   WO 2013/165798   11/2013

*Primary Examiner* — Mary Ellen Bowman

(57) ABSTRACT

The present disclosure is directed to examples of a through wall light fixture. In one embodiment, the through wall light fixture includes a collimated light source, an optic wave guide, wherein the collimated light source is coupled to a first end of the optic wave guide to be located closer to an interior side of a wall, and a light distribution element coupled to a second end of the optic wave guide to be located closer to an exterior side of the wall.

20 Claims, 4 Drawing Sheets

(56) References Cited

U.S. PATENT DOCUMENTS

2008/0089089 A1* 4/2008 Hama ............... A61B 1/0653
362/574
2012/0106149 A1   5/2012 Boa
2015/0267883 A1   9/2015 Hillyard et al.

* cited by examiner

US 10,317,025 B2

THROUGH WALL LIGHTING

CROSS REFERENCE TO RELATED APPLICATIONS

This application claims priority under 35 U.S.C. § 119(e) to U.S. provisional patent application Ser. No. 62/477,180, filed on Mar. 27, 2017, which is hereby incorporated by reference in its entirety.

BACKGROUND

Lighting are used for a variety of different applications. For example, lighting can be used to illuminate an area, a room, a surface, and the like. Lighting can come in a variety of different sizes, levels of brightness, designs, power consumption, costs, and the like.

Some light fixtures may be used to mark structures. For example, large beacon lights may be affixed to tall structures for aircraft. The lights may ensure that aircraft see the structure to avoid collision with the structure. However, these lights can be very expensive, heavy, and difficult to install in these tall structures.

SUMMARY

In one embodiment, the present disclosure provides a through wall light fixture. In one embodiment, the through wall light fixture comprises a collimated light source, an optic wave guide, wherein the collimated light source is coupled to a first end of the optic wave guide to be located closer to an interior side of a wall, and a light distribution element coupled to a second end of the optic wave guide to be located closer to an exterior side of the wall.

In one embodiment, the present disclosure provides another example of a through wall light fixture. In one embodiment, the through wall light fixture comprises a means for emitting a collimated light, a means for moving the collimated light, wherein the means for emitting a collimated light is coupled to a first end of the means for moving light to be located closer to an interior side of a wall, and a means for distributing light coupled to a second end of the means for moving light to be located closer to an exterior side of the wall.

In one embodiment, the present disclosure provides a method for installing a through wall light fixture. In one embodiment, the method comprises drilling a hole through an interior side of a wall, wherein the hole has a diameter approximately equal to the diameter of the through wall light fixture, inserting the through wall light fixture through the hole such that a light distribution element coupled to an outer end of an optic waveguide protrudes through an exterior side of the wall, electrically connecting a light source of the through wall light fixture to a power source and a controller, and enclosing a collimation optic that contains the light source, the power source, and the controller on the interior side of the wall via a housing that is coupled to the interior side of the wall.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a through wall light fixture. As discussed above, some light fixtures may be used to mark structures. For example, large beacon lights may be affixed to tall structures for aircraft. The lights may ensure that aircraft see the structure to avoid collision with the structure. However, these lights can be very expensive, heavy, and difficult to install in these tall structures.

In addition, light fixtures to mark structures may have strict requirements related to an amount of light that can be emitted above and below the horizon. For example, the regulations may be required to prevent light pollution from these light fixtures that are affixed to tall structures.

Embodiments of the present disclosure provide a "pin" light fixture that can be inserted into the wall of the structure (e.g., a wind turbine) from an inside of the structure. As a result, the light fixture is relatively light (i.e., not heavy), can be easily carried up the high structures, and installed from inside of the structure. In addition, the "pin" light fixture may provide sufficient light that can be viewed by aircraft to mark the structure with little to no light pollution above and below the horizontal plane.

Figure 1:
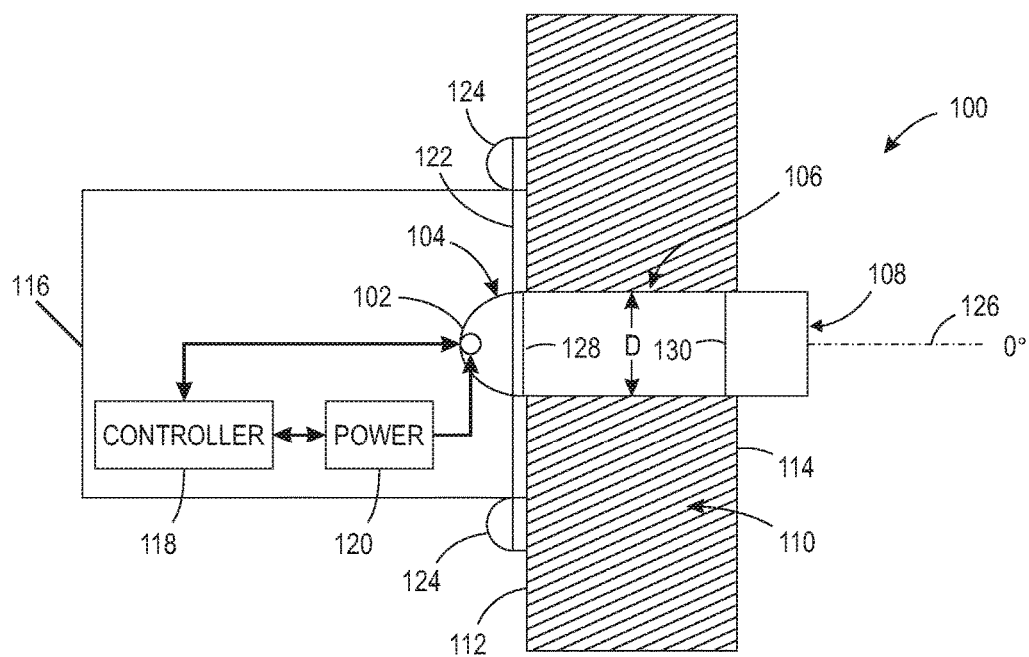
FIG. 1 depicts a block diagram of one embodiment of an example of a through wall light fixture.

FIG. 1 illustrates an example through wall light fixture 100. The through wall light fixture 100 may also be referred to as "pin" light as the light fixture 100 is designed relatively small to fit through a "pin hole" in a wall 110. The wall 110 may be part of a tower or high structure. The wall 110 may have an interior side 112 and an exterior side 114 that is exposed to the outdoor environment. In one embodiment, the through wall light fixture 100 may be fitted through a hole that has a diameter that is approximately equal to a diameter D of the through wall light fixture 100.

The through wall light fixture 100 may emit a light towards the exterior side 114 and out into the outdoor environment such that the light can be seen by aircraft at night. The through wall light fixture 100 may mark the structure to prevent aircraft from colliding into the structure.

In one embodiment, the through wall light fixture 100 may include a collimation optic 104, a light source 102 coupled to the collimation optic 104, an optic wave guide 106, and a light distribution element 108. In one embodiment, the light source 102 may be any means for emitting light. For example, the light source 102 may be a light emitting diode (LED). The light source 102 may comprises a plurality of light sources arranged in any configuration (e.g., an array of LEDs, a circular distribution of LEDs, and the like).

In one embodiment, the collimation optic 104 may be any means for collimating light. The collimation optic 104 may be coupled to a first end 128 of the optic wave guide 106 that is located closer to or around an interior side 112 of the wall 110. The collimation optic 104 may comprise a total internal reflection (TIR) lens, a metalized reflector, or any combination thereof. The light source 102 may be coupled to an inner portion, or inside of, the collimation optic 104. The light source 102 may be coupled to a central location of the collimation optic 104. The collimation optic 104 may collimate light emitted by the light source 102 in the vertical axis (e.g., a range of angles above and below a central axis 126 of the through wall light fixture 100 that represents 0 degrees).

In one embodiment, the collimation optic 104 may be any means for collimating light or have any design that can collimate the light output to have a beam spread of 20 degrees or less. For example, the beam spread may be between +10 degrees and −10 degrees axially symmetric around the central axis 126.

Although the through wall light fixture 100 is illustrated as having a collimation optic 104 and a light source 102, any collimated light source may be used. For example, the light source 102 may be a collimated light source, such as a laser. Thus, when the light source 102 is a collimated light source the collimation optic 104 may be removed, or optional.

In one embodiment, the optic wave guide 106 may be any means for moving light emitted from the light source 102. The optic wave guide 106 may have the first end 128 coupled to the collimation optic 104, as described above. A second end 130 that is on the exterior side 114 of the wall 110 may be coupled to the light distribution element 108.

The optic wave guide 106 may have a cylindrical shape. A length of the optic wave guide 106 (e.g., a distance form the first end 128 to the second end 130) may be a function of a thickness of the wall 110 (e.g., a distance from the interior side 112 to the exterior side 114). The length of the optic wave guide 106 may be approximately the thickness of the wall 110 such that the collimation optic 104 protrudes beyond the interior side 112 of the wall 100 and the light distribution element 108 extends beyond the exterior side 114 of the wall 110.

In one embodiment, the optic wave guide 106 may be a hollow pipe with a reflective inner surface. The optic wave guide 106 may be fabricated from a clear plastic light pipe, be fabricated from one or more optical fibers, and the like. In other words, the optic wave guide 106 may transport light emitted from the light source 102 towards the light distribution element 108 with little to no loss of light along the length of the optic wave guide 106.

Figure 3:
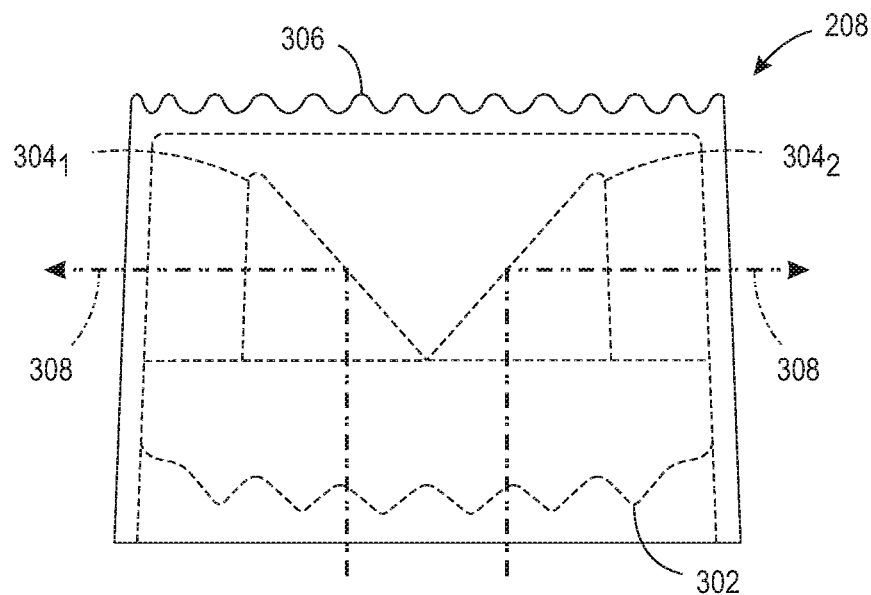
FIG. 3 depicts a side view of an example light distribution element of the through wall light fixture.
Figure 4:
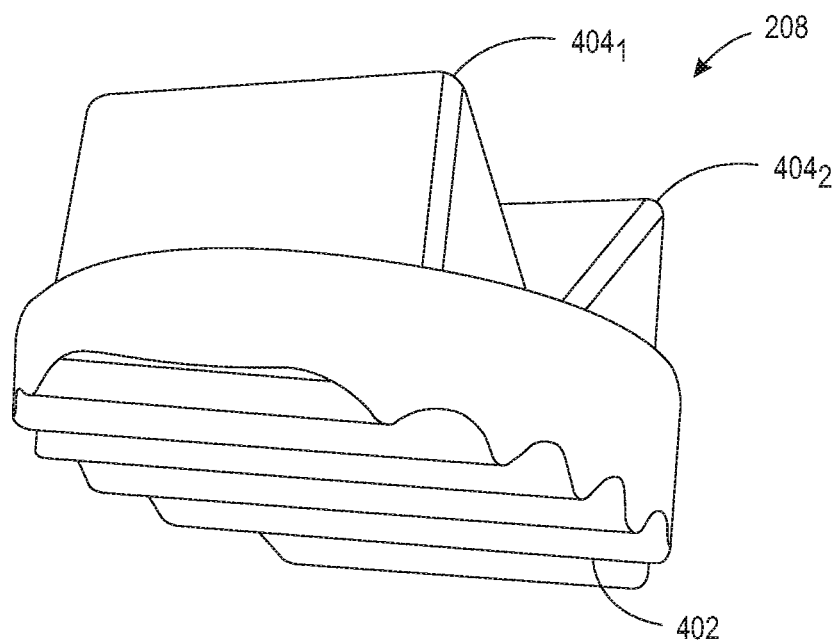
FIG. 4 depicts an isometric bottom view of another example light distribution element of the through wall light fixture.
Figure 5:
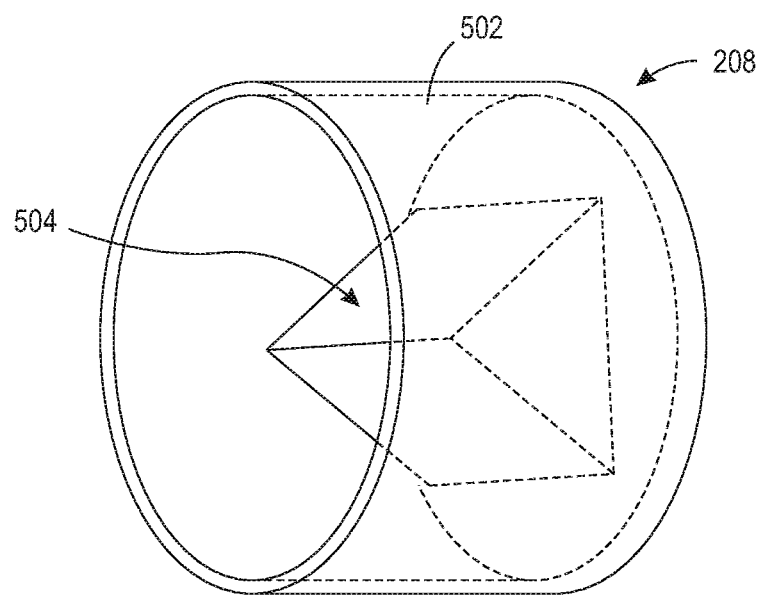
FIG. 5 depicts an isometric side view of another example light distribution element of the through wall light fixture.

In one embodiment, the light distribution element 108 may be any means for distributing light in a desired pattern. The light distribution element 108 may be coupled to the second end 130 of the optic wave guide 106 that is located closer to, or around, the exterior side 114 of the wall 110. The light distribution element may comprise a single optic or a multiple different optics (e.g., a compound optic). The optic or optics in the light distribution element 108 may be a TIR element, a refractive element, a metalized optical element, or any combination thereof. Different examples of the light distribution element 108 are illustrated in FIGS. 3-5 and discussed in further detail below.

In one embodiment, the through wall light fixture 100 may be enclosed on the interior side 112 of the wall 110 via a housing 116. The housing 116 may include one or more mechanical features 124 to connect the housing 116 to the interior side 112 of the wall 110. In one example, the mechanical features 124 may be a tab with a hole to drill a screw or bolt through. The mechanical feature 124 be a socket or other coupling means.

In one embodiment, the housing 116 may include a gasket 122 that provides a seal against the interior side 112 of the wall 110. The gasket 122 may prevent air, debris, snow, moisture, and the like, from coming in through the opening from the exterior side 114 of the wall 110. The gasket 122 may be made of a foam, plastic, or rubber material.

In one embodiment, a controller 118 and a power supply 120 may be located inside of the housing 116. The controller 118 and the power supply 120 may be electrically coupled to the light source 102. The controller 118 may control operation of the light source 102. For example, the controller 118 may provide lighting programs, remote light control capability through wireless signals, and the like. The power supply 120 may provide power to drive the light source 102.

In one embodiment, the housing 116 may include an opening (not shown). The opening may allow easy access to the electrical connections, the controller 118, or the power supply 120 for repairs, replacement, maintenance, and the like.

Figure 2:
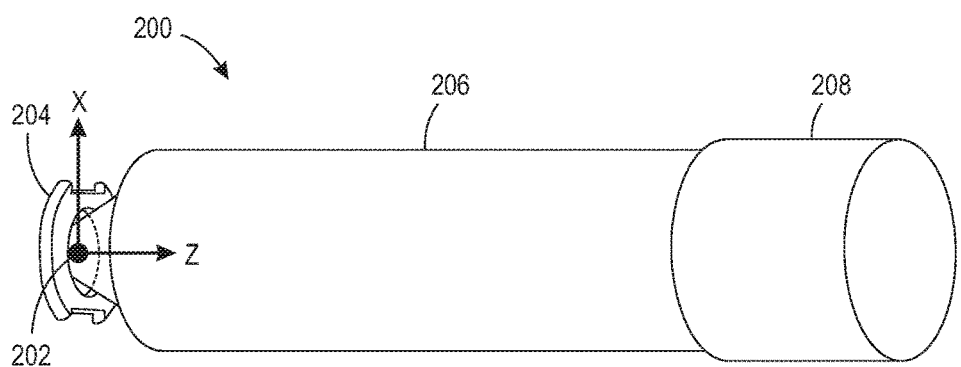
FIG. 2 depicts a more detailed diagram of one embodiment of an example through wall light fixture.

FIG. 2 illustrates a more detailed diagram of one embodiment of a through wall light fixture 200. The through wall light fixture 200 may include a light source 202, a collimation optic 204, a optic wave guide 206, and a light distribution element 208, similar to the through wall light fixture 100.

As discussed above, although the through wall light fixture 200 is illustrated as having a collimation optic 204 and a light source 202, any collimated light source may be used. For example, the light source 202 may be a collimated light source, such as a laser. Thus, when the light source 202 is a collimated light source the collimation optic 204 may be removed, or optional.

The collimation optic 204 may be coupled a first end of the optic wave guide 206 and the light distribution element 208 may be coupled to a second, opposite, end of the optic wave guide 206, as illustrated in FIG. 2. In one embodiment, the light distribution element 208 may be a refractive compound optic as illustrated in FIG. 2. However, as noted above, the light distribution element 208 may have various different designs.

FIG. 3 illustrates a side view of an example light distribution element 208. The light distribution element 208 may be a compound optic that includes multiple optical features 302, 304, and 306. In one embodiment, the optical feature 302 may be a refractive element that moves a vertical peak intensity in a direction from 0 degrees to 12 degrees. The movement may have a tolerance of +/−6 degrees around the vertical peak intensity that may not be at the center of the through wall light fixture 200.). The optical feature 302 may be textured.

The optical feature 304 may include a pair of optical features $304_1$ and $304_2$. In one embodiment, the optical features 304 may be TIR optics. The optical features 304 may split a light beam into two beams horizontally, as shown by arrows 308.

In one embodiment, the optical feature 306 may be a refractive lens that is textured. Any type of texture may be applied such as a lenticular texture. The texture may help to distribute the light intensity uniformly along the horizon or the horizontal plane (e.g., a plane into and out of the page along the central axis 126 in FIG. 1 or along the surface of the page in FIG. 3).

FIG. 4 illustrates another example of the light distribution element 208. The light distribution element 208 may include optical features 402 and 404. The optical feature 402 may be a textured refractive lens. The optical features 404₁ and 404₂ may be TIR lenses.

FIG. 5 illustrates another example of the light distribution element 208. In one embodiment, the light distribution element 208 may include optical features 502 and 504. The optical feature 502 may be a refractive lens. The optical feature 504 may be metallized reflector. The optical feature 504 may reflect light in opposite directions to split the light beam along the horizontal.

As can be seen in the examples illustrated in FIGS. 3-5, the light distribution element 208 may have a particular orientation. In other words, the light distribution element 208 may be designed to be orientated correctly such that the light emitted from the light source 202 is split along the horizontal plane rather than the vertical plane (which may cause undesirable light pollution).

Figure 6:
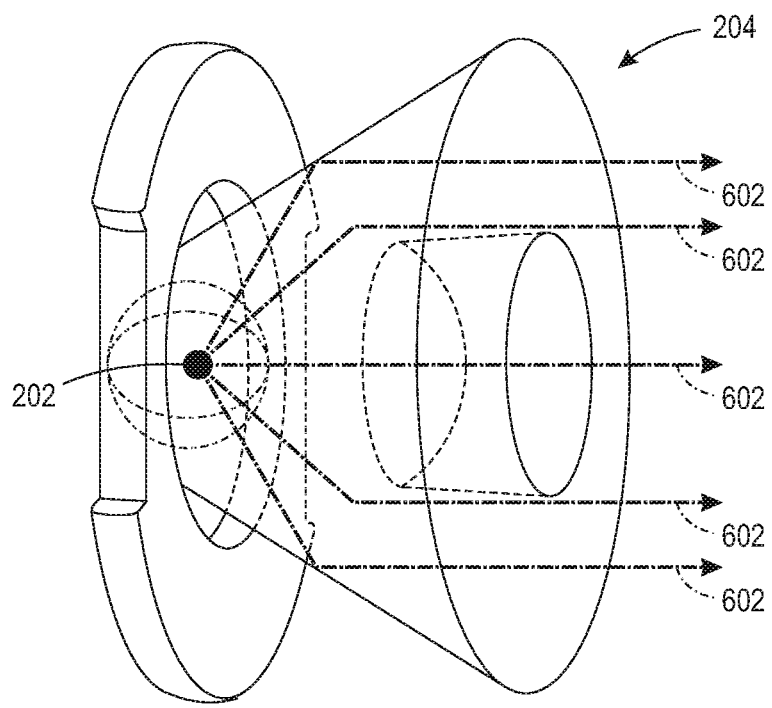
FIG. 6 depicts a isometric side view of an example collimation optic of the through wall light fixture.

FIG. 6 illustrates a larger and more detailed view of the collimation optic 204. The light source 202 may be any type of light source such as an LED or an array of LEDs. The collimation optic 204 may be a TIR lens that has a conic shape. The light source 202 may be located approximately below, and approximately at a center, of the TIR lens of the collimation optic 204. The collimation optic 204 may redirect light emitted from the light source 202 to have a relatively narrow beam spread in a relatively straight, or parallel direction, along the horizontal, as shown by arrows 602.

Thus, the present disclosure provides a through wall light fixture or a "pin" light fixture that can be inserted into a wall of a structure from the inside of the structure. The light fixture may be relatively light and small in design. In addition, the design of the light fixture allows the light fixture to be installed from the inside of the structure rather than the outside of the structure similar to other light beacons that are installed on tall structures and towers.

Figure 7:
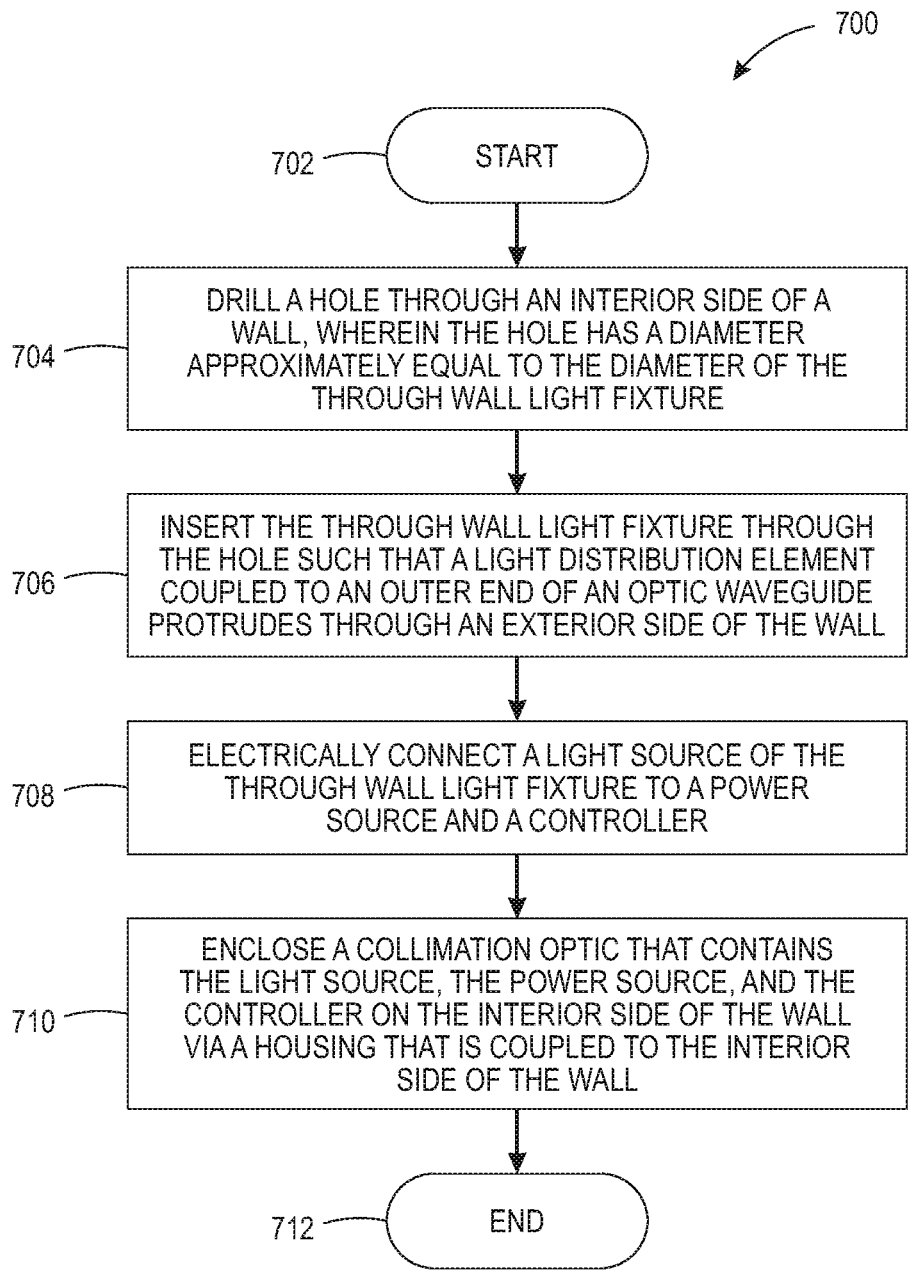
FIG. 7 depicts an example flow diagram of a method for installing a through wall light fixture.

FIG. 7 illustrates an example flowchart of one embodiment of a method 700 for installing a through wall light fixture. The method 700 begins at step 702. At step 704, the method 700 drills a hole through an interior side of a wall, wherein the hole has a diameter approximately equal to the diameter of the through wall light fixture. For example, the through wall light fixture may be installed from the inside of a structure. The wall may be part of a wind turbine, a tower, or other high structure. The hole may be drilled through the wall such that outside of the wall can be seen through the hole.

At step 706, the method 700 inserts the through wall light fixture through the hole such that a light distribution element coupled to an outer end of an optic waveguide protrudes through an exterior side of the wall. For example, the through wall light fixture may be orientated such that light is emitted out of the light distribution element and away from the exterior side of the wall. The light source may allow aircraft to see the structure at night.

In one embodiment, as described above, the through wall light fixture maybe designed to be relatively small. The through wall light fixture may also be designed to collimate light in the vertical axis to prevent light pollution. For example, the beam spread in the vertical axis could be less than 20 degrees. In addition, the through wall light fixture may distribute light across a wide angle in the horizontal axis. For example, the beam spread across the horizontal axis could be up to 180 degrees.

At step 708, the method 700 electrically connects a light source of the through wall light fixture to a power source and a controller. For example, the controller, wiring, power source and the like may be located on the interior side of the wall. As a result, technicians may easily access the connections, the power source, and the controller if maintenance or troubleshooting is needed.

At block 710, the method 700 encloses a collimation optic that contains the light source, the power source, and the controller on the interior side of the wall via a housing that is coupled to the interior side of the wall. The collimation optic of the through wall light fixture may be located closer to the interior side of the wall and have the light source that emits light towards the exterior side of the wall. The housing may protect the through wall light fixture to ensure that the through wall light fixture is not accidentally pulled out or pushed through the hole. In addition, the housing may provide a seal to prevent any air or draft from entering the interior side of the wall through the hole. At block 712, the method 700 ends.

It should be noted that although not explicitly specified, one or more steps or operations of the method 700 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 7 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A through wall light fixture, comprising:
   a collimated light source;
   an optic wave guide, wherein the collimated light source is coupled to a first end of the optic wave guide to be located closer to an interior side of a wall; and
   a light distribution element coupled to a second end of the optic wave guide to be located closer to an exterior side of the wall.

2. The through wall light fixture of claim 1, wherein a length of the through wall light fixture is greater than a thickness of the wall.

3. The through wall light fixture of claim 1, further comprising:
   a housing, wherein the housing comprises mechanical features to connect to the interior side of the wall and enclose the collimated light source that is located closer to the interior side of the wall.

4. The through wall light fixture of claim 1, wherein the collimated light source comprises:
   a collimation optic; and
   a light source coupled to the collimation optic.

5. The through wall light fixture of claim 4, wherein the collimation optic comprises a total internal reflection lens.

6. The through wall light fixture of claim 4, wherein the collimation optic comprises a metallized reflector.

7. The through wall light fixture of claim 4, wherein the light source comprises a light emitting diode (LED).

8. The through wall light fixture of claim 1, wherein collimated light source comprises a laser.

9. The through wall light fixture of claim 1, wherein the optic wave guide comprises a cylindrical shape.

10. The through wall light fixture of claim 1, wherein the optic wave guide comprises a hollow pipe with a reflective inner surface.

11. The through wall light fixture of claim 1, wherein the optic wave guide comprise a clear plastic light pipe.

12. The through wall light fixture of claim 1, wherein the optic wave guide comprise an optical fiber.

13. The through wall light fixture of claim 1, wherein the light distribution element comprises at least one of: a total internal reflection optical element, a refractive optical element, or a metalized optical element.

14. The through wall light fixture of claim 1, wherein the light distribution element comprises compound optics.

15. The through wall light fixture of claim 14, wherein the compound optics, comprises:
a first optical feature to move a vertical peak intensity of a light emitted by the light source;
a second optical feature to split the light emitted by the lights source into to horizontal beams; and
a third optical feature to provide a uniform light intensity along a horizontal plane.

16. The through wall light fixture of claim 15, wherein the first optical feature comprises a textured outer lens.

17. The through wall light fixture of claim 15, wherein the second optical feature comprises an opposing pair of total internal reflection lenses.

18. The through wall light fixture of claim 16, wherein the third optical feature comprises a textured inner lens.

19. A through wall light fixture, comprising:
a means for emitting a collimated light;
a means for moving the collimated light, wherein the means for emitting the collimated light is coupled to a first end of the means for moving light to be located closer to an interior side of a wall; and
a means for distributing light coupled to a second end of the means for moving light to be located closer to an exterior side of the wall.

20. A method for installing a through wall light fixture, comprising:
drilling a hole through an interior side of a wall, wherein the hole has a diameter approximately equal to the diameter of the through wall light fixture;
inserting the through wall light fixture through the hole such that a light distribution element coupled to an outer end of an optic waveguide protrudes through an exterior side of the wall;
electrically connecting a light source of the through wall light fixture to a power source and a controller; and
enclosing a collimation optic that contains the light source, the power source, and the controller on the interior side of the wall via a housing that is coupled to the interior side of the wall.

* * * * *